United States Patent
Bergh (10) Patent No.: US 9,482,453 B2
(45) Date of Patent: Nov. 1, 2016

(54) AIR DRYER ASSEMBLY

(75) Inventor: Charles J. Bergh, Berwyn, PA (US)

(73) Assignee: Ingersoll-Rand Company, Davidson, NC (US)

( * ) Notice: Subject to any disclaimer, the term of this patent is extended or adjusted under 35 U.S.C. 154(b) by 944 days.

(21) Appl. No.: 13/549,499

(22) Filed: Jul. 15, 2012

(65) Prior Publication Data

US 2013/0175003 A1    Jul. 11, 2013

Related U.S. Application Data

(63) Continuation of application No. PCT/US2010/021130, filed on Jan. 15, 2010.

(51) Int. Cl.
*F25B 29/00* (2006.01)
*B01D 53/26* (2006.01)

(52) U.S. Cl.
CPC .......... *F25B 29/003* (2013.01); *B01D 53/265* (2013.01); *F25B 29/00* (2013.01); *F25B 2313/0231* (2013.01)

(58) Field of Classification Search
CPC ............. F25B 29/003; F25B 2313/0231; F25B 29/00; B01D 53/265; F24F 3/1405; F24F 3/153; F24F 2221/54; F28D 2021/0038; F25D 31/005
USPC ................................................ 165/61; 62/93
See application file for complete search history.

(56) References Cited

U.S. PATENT DOCUMENTS

| | | |
|---|---|---|
| 3,585,808 A | 6/1971 | Huffman |
| 3,797,565 A | 3/1974 | Fernandes |
| 3,818,718 A | 6/1974 | Freese |
| 4,027,729 A | 6/1977 | Bruhl |
| 4,242,110 A | 12/1980 | Hynes |

(Continued)

FOREIGN PATENT DOCUMENTS

| | | |
|---|---|---|
| CH | 579946 A | 9/1976 |
| CN | 1721042 A | 1/2006 |

(Continued)

OTHER PUBLICATIONS

Chinese Office Action with English translation and search report in corresponding CN application (i.e., 201080065472.5), dated Feb. 28, 2014 (27 pages).

(Continued)

*Primary Examiner* — Marc Norman
*Assistant Examiner* — Jon T Schermerhorn
(74) *Attorney, Agent, or Firm* — Taft Stettinius & Hollister LLP (57) ABSTRACT

A dryer operable to separate a portion of an entrained liquid from a flow of gas includes a pressure vessel to contain the flow of gas and entrained liquid within the pressure vessel. A precooler/reheater is positioned within the pressure vessel to cool the flow of gas and the entrained liquid and an evaporator is positioned within the pressure vessel to cool the flow of gas and the entrained liquid from the precooler/reheater. A separator receives the flow of gas and the entrained liquid from the evaporator and is operable to separate the flow of gas and the entrained liquid into a flow of substantially dry gas and a liquid. The liquid collects in the bottom of the pressure vessel. A drain valve is movable between an open position and a closed position in response to the quantity of liquid within the bottom of the pressure vessel.

25 Claims, 7 Drawing Sheets

(56) References Cited

U.S. PATENT DOCUMENTS

| | | | |
|---|---|---|---|
| 4,722,744 A * | 2/1988 | Stoll | 96/410 |
| 5,014,774 A | 5/1991 | Siak et al. | |
| 5,275,233 A | 1/1994 | Little | |
| 5,385,603 A | 1/1995 | Sienack | |
| 5,983,651 A | 11/1999 | Huang | |
| 6,063,510 A | 5/2000 | Inabayashi et al. | |
| 6,085,529 A | 7/2000 | Galus et al. | |
| 6,186,223 B1 | 2/2001 | Bergh et al. | |
| 6,244,333 B1 | 6/2001 | Bergh et al. | |
| 6,691,428 B1 | 2/2004 | Zarif | |
| 7,121,102 B2 | 10/2006 | Fijas et al. | |
| 7,156,156 B2 * | 1/2007 | Haller et al. | 165/10 |
| 7,213,402 B2 * | 5/2007 | Bellemo | 62/93 |
| 2002/0078566 A1 | 6/2002 | Torigoe et al. | |
| 2010/0294776 A1 * | 11/2010 | Liu | 220/562 |

FOREIGN PATENT DOCUMENTS

| | | |
|---|---|---|
| JP | 60191190 A | 9/1985 |
| JP | 10148483 A | 6/1998 |
| NL | 7610120 A | 3/1978 |

OTHER PUBLICATIONS

RAAL, R&D News, http://www.raal.ro/rd.php, Nov. 5, 2009.

* cited by examiner

AIR DRYER ASSEMBLY

RELATED APPLICATIONS

The present application is a continuation of PCT/US2010/021130 filed Jan. 15, 2010 and incorporated herein by reference.

BACKGROUND

The present invention relates to air dryers for use with compressors, and more particularly to air dryers wholly contained within a single pressure vessel.

Compressor systems are often used to provide compressed air for use in powering machinery, hand tools, and the like. Air compressors typically compress atmospheric air which contains some moisture. It is important that the compressed air delivered to these points-of-use be substantially dry, as moisture can cause damage or corrosion in the machines or tools.

SUMMARY

In one construction, the invention provides a dryer operable to separate a portion of an entrained liquid from a flow of gas. The dryer includes a pressure vessel operable to contain the flow of gas and entrained liquid within the pressure vessel at a full operating pressure. The pressure vessel includes a gas inlet, a gas outlet, and a drain positioned at a bottom of the pressure vessel. A precooler/reheater is positioned within the pressure vessel to receive and cool the flow of gas and the entrained liquid from the inlet and an evaporator is positioned within the pressure vessel to receive and cool the flow of gas and the entrained liquid from the precooler/reheater. A separator is positioned to receive the flow of gas and the entrained liquid from the evaporator. The separator is operable to separate the flow of gas and the entrained liquid into a flow of substantially dry gas and a liquid. The liquid collects in the bottom of the pressure vessel, and the flow of substantially dry gas flows upward through the precooler/reheater to heat the flow of substantially dry gas and out the gas outlet. A drain valve is movable between an open position and a closed position in response to the quantity of liquid within the bottom of the pressure vessel. The liquid in the bottom of the pressure vessel exits via the drain when the drain valve is in the open position.

In another construction, the invention provides a gas compression system that includes a compressor operable to produce a flow of compressed gas, the compressed gas including a quantity of moisture, a refrigeration system operable to produce a flow of chilled refrigerant, and a pressure vessel including an outlet, a drain, and an inlet in fluid communication with the compressor to receive the flow of compressed gas and the quantity of moisture. A precooler/reheater is positioned within the pressure vessel to receive and cool the flow of compressed gas and the quantity of moisture from the inlet, and a dual layer evaporator is positioned within the pressure vessel to receive and cool the flow of gas and the entrained liquid from the precooler/reheater. The dual layer evaporator includes a first layer formed to pass the flow of chilled refrigerant and a second layer formed to hold a heat sink fluid. The flow of chilled refrigerant is operable to cool the flow of compressed gas and the heat sink fluid. A separator is positioned to receive the flow of compressed gas and the quantity of moisture and is operable to separate the flow of compressed gas and the quantity of moisture into a flow of substantially dry gas and a quantity of liquid.

In yet another construction, the invention provides a gas compression system that includes a compressor operable to produce a flow of compressed gas, the compressed gas including a quantity of moisture, a refrigeration system operable to produce a flow of chilled refrigerant, and a pressure vessel including an outlet, a drain, and an inlet in fluid communication with the compressor to receive the flow of compressed gas and the quantity of moisture. A precooler/reheater includes an upper surface and a lower surface that is substantially parallel to the upper surface. The precooler/reheater includes a plurality of corrugated plates having corrugations that are arranged at an oblique angle with respect to the upper surface and the lower surface. The corrugated plates cooperate to define a first plurality of flow paths and a separate second plurality of flow paths, the flow of compressed gas and the quantity of moisture pass downward through the first plurality of flow paths to cool the flow of compressed gas and the quantity of moisture. An evaporator is positioned within the pressure vessel to receive the flow of chilled refrigerant and to further cool the flow of compressed gas and the quantity of moisture, and a separator is positioned to receive the flow of compressed gas and the quantity of moisture from the evaporator. The separator is operable to separate the flow of compressed gas and the quantity of moisture into a flow of substantially dry gas and a liquid. The liquid collects in the bottom of the pressure vessel and the flow of substantially dry gas flows upward through the second plurality of flow paths to heat the flow of substantially dry gas and out the gas outlet. A drain valve is movable between an open position and a closed position in response to the quantity of liquid within the bottom of the pressure vessel, wherein the water in the bottom of the pressure vessel exits via the drain when the drain valve is in the open position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
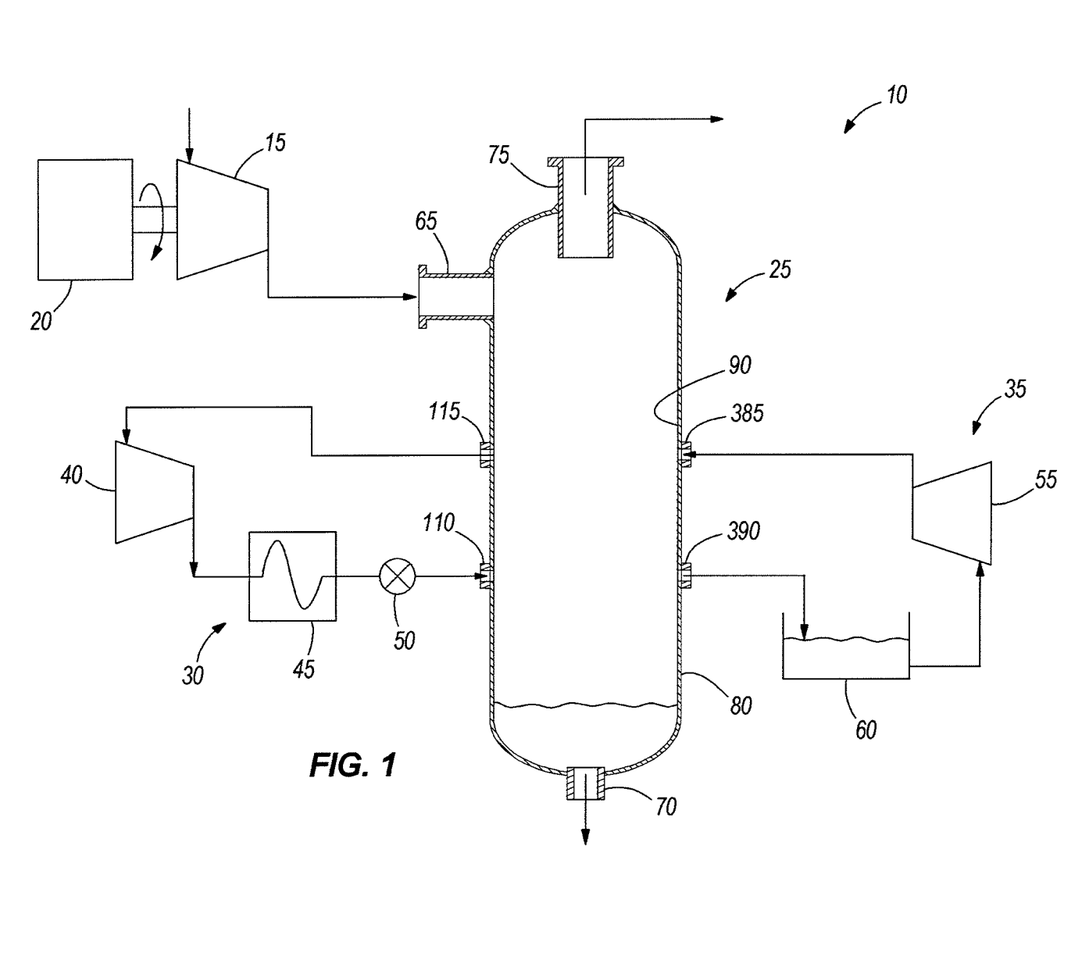
FIG. 1 is a schematic illustration of a compressor system including a dryer.

FIG. 1 schematically illustrates a gas compression system 10 that includes a compressor 15, a prime mover 20, and a dryer 25. The compression system 10 may optionally include a refrigeration system 30 and a second fluid system 35. The refrigeration system 30 includes a refrigerant compressor 40, a condenser 45, and an expansion device 50 as is typical with refrigeration systems 30. The second fluid system 35 includes a pump 55 and a reservoir 60 for a second fluid.

The prime mover 20 can include an electric motor, an engine (e.g., internal combustion, rotary, turbine, diesel, etc.), or any other drive capable of providing shaft power to the compressor 15.

The compressor 15 includes an inlet that provides a fluid flow path for incoming gas to be compressed and an outlet through which compressed gas is discharged. The illustrated system is an open system for compressing air. Thus, air is drawn into the compressor 15 from the atmosphere and is compressed and discharged through the outlet. However, it should be understood that the compressor system 10 illustrated in FIG. 1 could be employed to compress many other gasses, and could be employed in a closed cycle (e.g., refrigeration system) if desired.

The compressor 15 includes a shaft that is driven by the prime mover 20 to rotate a rotating element of the compressor 15. In some constructions, the compressor 15 includes a rotary screw compressor that may be oil flooded or oil less. In the oil flooded constructions, an oil separator would be employed to separate the oil from the compressed air before the air is directed to the dryer 25. In other constructions, a centrifugal or other compressor arrangement may be employed. Of course, single stage or multi-stage compressors could also be employed as may be required for the particular application.

The dryer 25 includes an air inlet 65 that receives compressed air from the compressor 15. In an open air compression system 10 as illustrated in FIG. 1, the compressed air includes moisture or water that is in the air that is drawn into the compressor 15. During compression, the moisture is carried by the flow of compressed air as entrained liquid or a quantity of moisture. The dryer 25 operates to separate a portion of the entrained liquid or quantity of moisture from the flow of compressed air, discharges the liquid from a drain 70 on the bottom of the dryer 25, and discharges the flow of substantially dry compressed air from an air outlet 75 at the top of the dryer 25.

Figure 2:
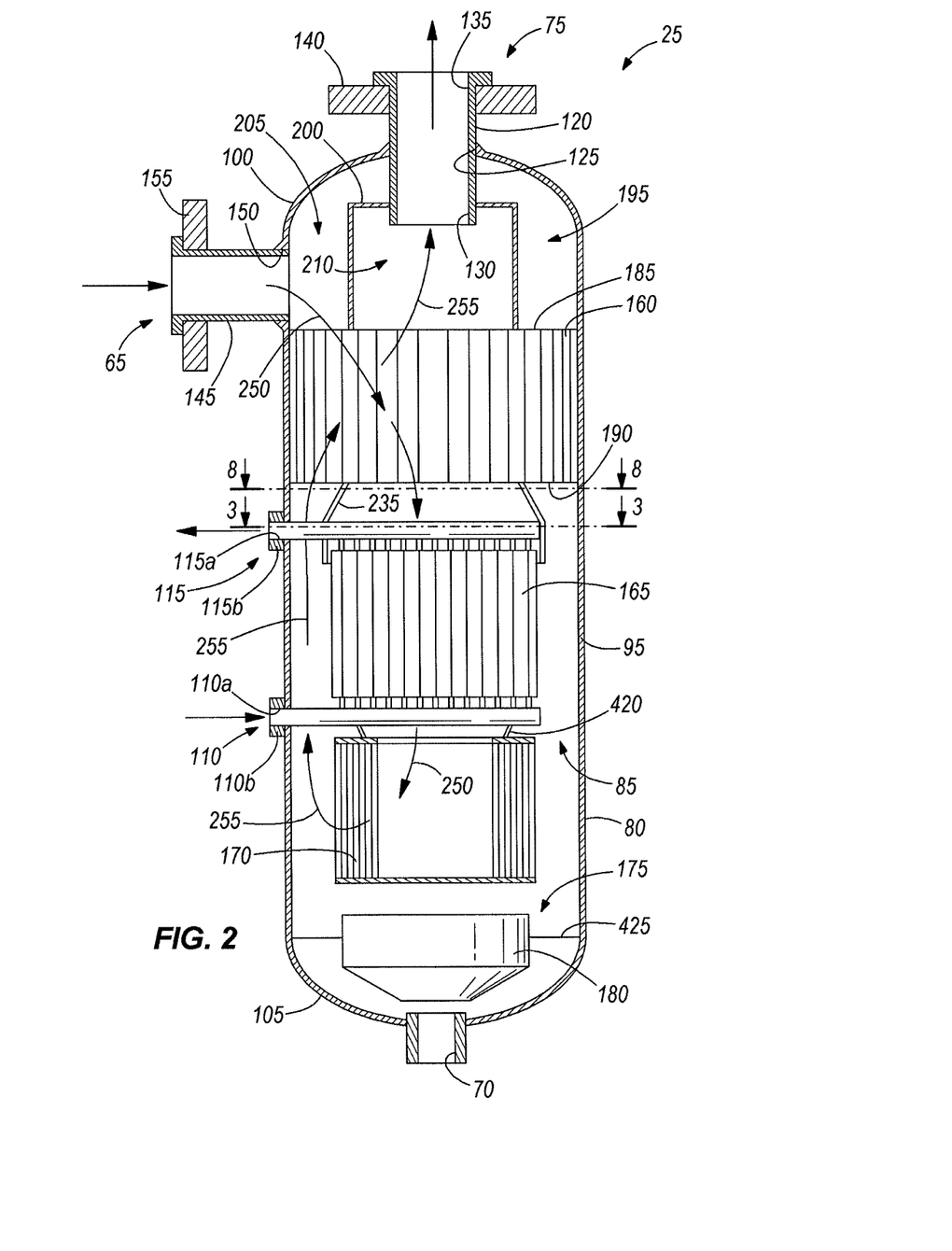
FIG. 2 is a partial section view of a dryer suitable for use in the compressor system of FIG. 1.

With reference to FIG. 2, the dryer 25 includes a housing or pressure vessel 80 that defines an interior space 85 that receives the flow of compressed gas. In some constructions, a plastic or stainless steel liner 90 is positioned within the pressure vessel 80 to reduce the likelihood of corrosion. Thus, the pressure vessel 80 contains the full operating pressure of the compressor 15. In the illustrated construction, the pressure vessel 80 includes a substantially cylindrical portion 95 that defines a cylindrical inner surface. An upper dome 100 and a lower dome 105 attach to the cylindrical portion 95 to complete the pressure vessel 80.

The pressure vessel 80 also includes the drain 70, the compressed gas inlet 65, the compressed gas outlet 75, a refrigerant inlet 110, and a refrigerant outlet 115. The drain 70 is positioned at the lowermost point of the lower dome 105 to facilitate the draining of liquid from the bottom of the pressure vessel 80. The compressed gas outlet 75 includes a tubular extension 120 that extends through an aperture 125 in the pressure vessel 80 such that a first end 130 is disposed within the space beneath the upper dome 100 and a second end 135 is disposed outside of the pressure vessel 80. A bolting flange 140, or other attachment device may be attached to the second end 135 of the extension 120 to facilitate attachment of the compressed gas outlet 75 to a pipe or other component in the compressor system 10.

The compressed gas inlet 65 includes a pipe 145 that extends from the outer surface of the cylindrical portion 95 of the pressure vessel 80 and surrounds an aperture 150 in the pressure vessel 80. As with the compressed gas outlet 75, a bolting flange 155, or other attachment device may be attached to the pipe 145 to facilitate attachment of the compressed gas inlet 65 to another pipe or component within the compressor system 10.

Each of the refrigerant inlet 110 and refrigerant outlet 115 includes an aperture 110a, 115a formed in the cylindrical portion 95 of the pressure vessel 80. An attachment flange 110b, 115b is attached to the external surface of the pressure vessel 80 to facilitate attachment of a pipe or other component to the refrigerant inlet 110 and refrigerant outlet 115. Of course, other attachments arrangements could be employed.

As illustrated in FIG. 2, the refrigerant inlet 110, the refrigerant outlet 115, and the compressed gas inlet 65 are arranged such that they are flush with the inner surface of the pressure vessel 80 to allow for the insertion or removal of components through the top of the pressure vessel 80 during assembly.

As illustrated in FIG. 2, these internal components include a precooler/reheater 160, an evaporator 165, a separator 170, and a drain valve 175 that are positioned within the interior space 85 defined by the pressure vessel 80. The drain valve 175 includes a float 180 disposed in the bottom of the pressure vessel 80. The float 180 is either formed to seal the drain opening 70 or moves a member that seals the opening 70. The float 180 is adapted to move between a closed position wherein the drain opening 70 is sealed and an open position in which the drain opening 70 is open or partially open to allow flow out of the pressure vessel 80 through the drain 70.

The precooler/reheater 160 is arranged in a cylindrical shape that is sized to closely match the size of the pressure vessel 80. Thus, the precooler/reheater 160 cooperates with the inner wall of the pressure vessel 80 to define a seal and to inhibit flow around the precooler/reheater 160. The precooler/reheater 160 includes a top surface 185 that is substantially planar and a bottom surface 190 that is substantially planar. The top surface 185 cooperates with the top of the pressure vessel and the upper dome 100 to define an upper space 195 into which the incoming flow of compressed gas enters. A divider 200 extends from the top surface 185 and sealingly engages the tubular extension 120 to divide the upper space 195 into an annular inlet space 205 and an outlet space 210 positioned within the annulus of the annular space 205.

Figure 8:
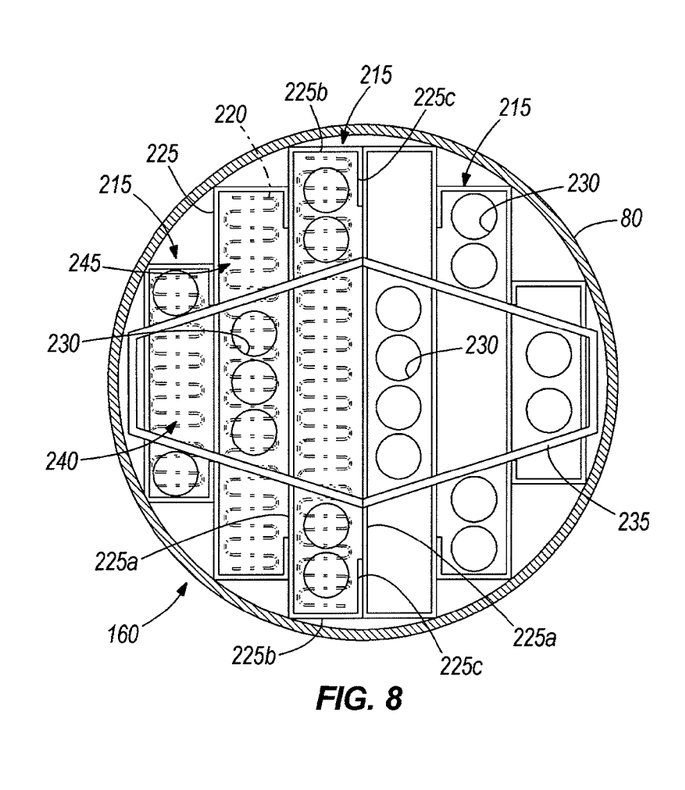
FIG. 8 is a partial section view taken along line 8-8 of FIG. 2, of one construction of a precooler/reheater for use in the dryer of FIG. 2.

FIG. 8 illustrates one possible construction of the precooler/reheater 160 that includes a plurality of stacked layers 215 with each layer 215 including a corrugated member 220 and a plate 225. The plate 225 includes a first surface 225a that extends the full width of the layer 215 and two side surfaces 225b that extend the full height of the layer 215. Two short surfaces 225c extend from the sides 225b along a portion of the width of the layer 215 in a direction substantially parallel to the first surface 225a. The plate 225 can be bent, formed or fabricated to this shape or another suitable shape, as may be desired. Thus, the plate 225 defines a partially enclosed space between the side walls 225*b*, the first wall 225*a*, and the short surfaces 225*c*. The corrugated member 230 is positioned within the space to define a plurality of flow paths that extend between the top surface 185 and the bottom surface 190. Adjacent layers 215 are stacked such that the first surface 225*a* of one layer 215 abuts the two short surfaces 225*c* of the adjacent layer 215 to fully enclose the corrugated member 220.

The top surface 185 and the bottom surface 190 are completely sealed with the exception of a number of flow apertures 230 that are positioned adjacent each layer 215 to either receive or discharge a flow of compressed gas. Thus, flow can only pass the precooler/reheater 160 by passing into one of the apertures 230 and out another aperture 230 on the opposite end. In one construction an elastomeric seal material is used to seal the ends of the layers 215. In still other constructions, an end plate is provided with the apertures 230 formed therein to direct the flow into and out of the various layers 215.

A polygonal guide 235 sealingly attaches to and extends from the bottom surface 190 of the precooler/reheater 160 and sealingly connects to the evaporator 165 to guide the flow of compressed gas downward to the evaporator 165. The polygonal guide 235 divides the bottom surface 190 of the precooler/reheater 160 into an inner portion 240 and an outer portion 245. It should be noted that while a polygonal guide 235 is illustrated, virtually any shape could be used for the guide 235.

As illustrated in FIG. 8, the apertures 230 within the inner portion 240 discharge a precooled flow of compressed gas 250, while the apertures 230 in the outer portion 245 receive a flow of substantially dry gas 255 to be reheated. As the flows 250, 255 move through the precooler/reheater 160, they move in diagonal directions and to the opposite of the inner portion 240 and the outer portion 245 at the top surface 185. For example, dry compressed gas 255 enters the bottom surface 190 of the precooler/reheater 160 via the apertures 230 disposed in the outer portion 245. Thus, dry compressed gas 255 is disposed in every other layer 215. The dry compressed gas 255 moves through the corrugations 220 until it reaches the top surface 185 of the precooler/reheater 160 and exits via apertures 230 disposed in the outlet space 210. The apertures 230 are similar to those illustrated in FIG. 8 but are in the same layer 215 as the inlets 230. Thus, flow 250 that enters the precooler/reheater 160 at the top surface 185 through the annular inlet space 205 exits the precooler/reheater 160 via the apertures 230 disposed in the inner portion 240 and is directed to the evaporator 165. Flow that enters the precooler/reheater 160 at the bottom surface 190 outer portion 245 exits the precooler/reheater 160 through apertures 230 disposed within the divider 200 that defines the outlet space 210 within the annulus of the inlet space 205.

Figure 9:
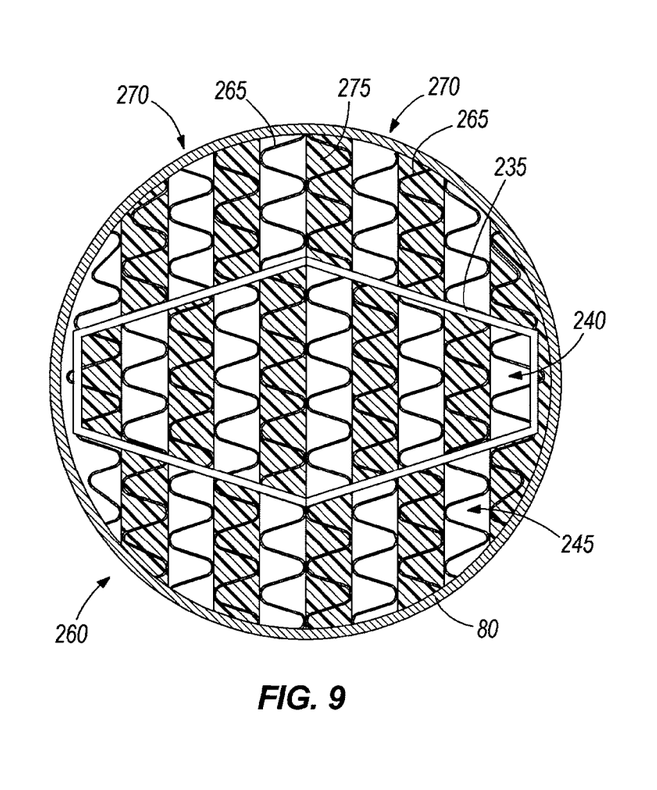
FIG. 9 is a partial section view taken along line 8-8 of FIG. 2, of another construction of a precooler/reheater for use in the dryer of FIG. 2.

FIG. 9 illustrates another construction of a precooler/reheater 260 that includes a plurality of corrugated members 265 that are stacked on top of one another to define a plurality of flow paths 270. Alternating flow paths 270 are used for the flow of compressed gas 250 in a downward direction with the remaining layers 270 facilitating the flow of substantially dry compressed gas 255 in an upward direction. The cross-hatched portions in FIG. 9 are sealed using an elastomeric sealing compound 275 to assure that flow that enters at the outer portion of one end is discharged from the inner portion of the opposite end and visa versa, similar to that described with regard to FIG. 8.

Figure 10:
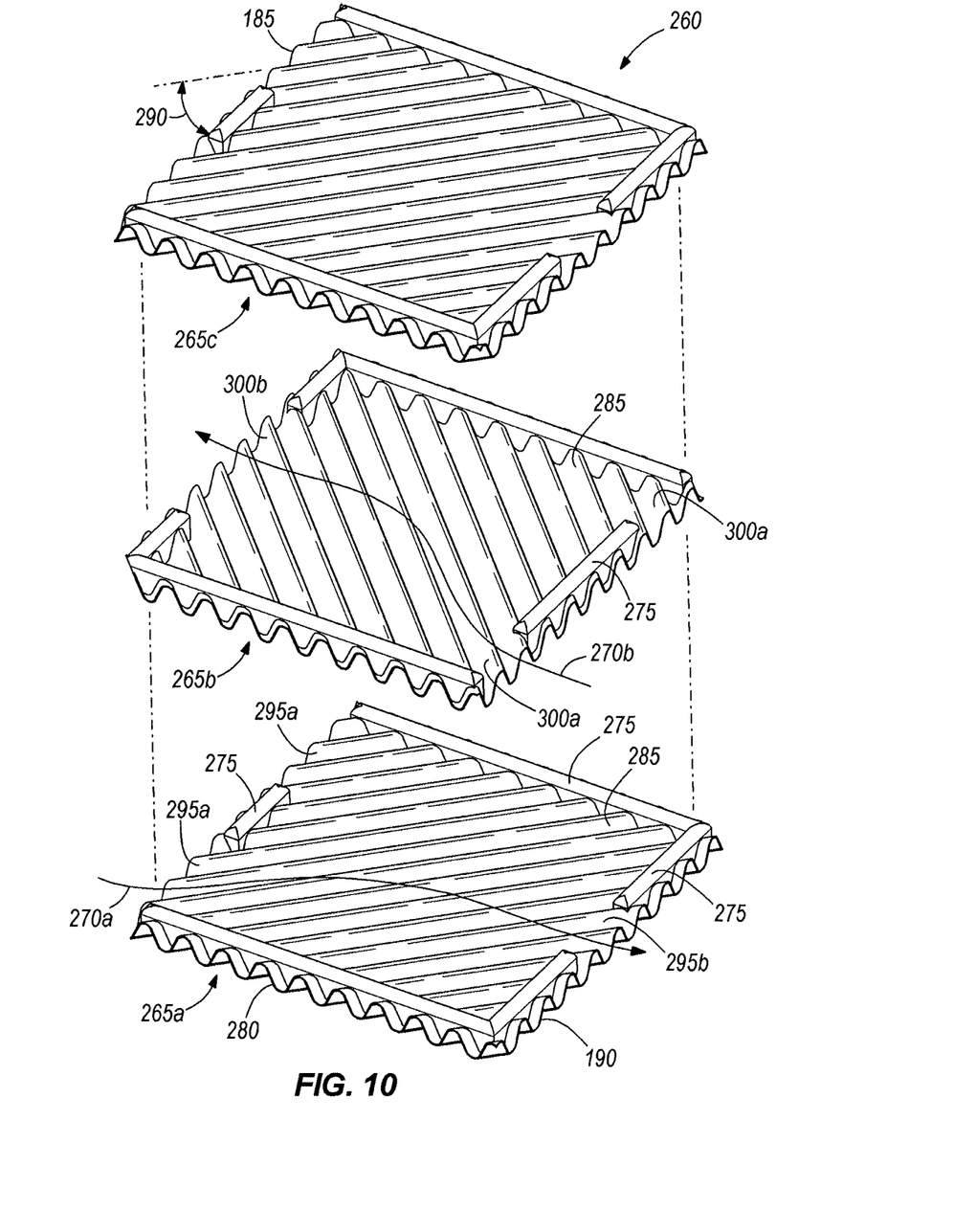
FIG. 10 is an exploded view of a portion of the precooler/reheater of FIG. 9.

FIG. 10 better illustrates the arrangement of the corrugated members 265 in the precooler/reheater 260 of FIG. 9. A first corrugated member 265*a* defines a portion of the top surface 185 adjacent a top plane and a portion of the bottom surface 190 adjacent a bottom plane. Two side surfaces 280 extend between the top surface 185 and the bottom surface 190. Corrugations 285 extend between the top surface 185 and the bottom surface 190 at an oblique angle 290 with respect to the top surface 185 and the bottom surface 190. In the illustrated construction, the angle 290 is about 45 degrees with other angles 290 also being suitable. The seal compound 275 is placed along each of the side surfaces 280, along a portion of the bottom surface 190, and along a portion of the top surface 185. In preferred constructions, the seal material 275 is an elastomeric material that deforms during assembly and then sets to form a seal. Of course, other materials may also be suitable.

A second corrugated member 265*b* that is substantially the same as the first corrugated member 265*a* is rotated 180 degrees with respect to the first corrugated member 265*a* and is placed on top of the first corrugated member 265*a*. By rotating the second corrugated member 265*b* with respect to the first corrugated member 265*a*, the corrugations 285 of the second corrugated member 265*b* will extend in a different direction across the corrugations 285 of the first corrugated member 265*a*. In the illustrated construction, the corrugations 285 of the second corrugated member 265*b* are oriented at an oblique angle 290 with respect to the top surface 185 and the bottom surface 190 and are oriented at about 90 degrees with respect to the corrugations 245 of the first corrugated member 265*a*.

The seal material 275 positioned on the first corrugated member 265*a* engages the second corrugated member 265*b* to substantially seal a first flow path 270*a* between the first corrugated member 265*a* and the second corrugated member 265*b*. The seal material 275 is arranged to define two openings 295*a* on the top surface 185 that are in the inlet space 205 of the precooler/reheater 260 and one opening 295*b* at the bottom surface 190 that is within the inner portion 240. Thus, the compressed air is forced to flow between the cross corrugations 285 which produces turbulent flow and enhances the heat transfer.

Seal material 275 is placed on the second corrugated member 265*b* in substantially the same positions as it was on the first corrugated member 265*a* such that when the second corrugated member 265*b* is rotated, there are two open areas 300*a* adjacent the bottom surface 190 and one open area 300*b* adjacent the top surface 185.

A third corrugated member 265*c* oriented the same as the first corrugated member 265*a* is positioned on top of the second corrugated member 265*b* to define a second flow path 270*b*. The second flow path 270*b* includes one opening 300*b* near the top surface 185 in the outlet space 210 and two openings 300*a* near the bottom surface 190 in the outer portion 245.

Additional flow paths 270 are created by repeating the pattern illustrated in FIG. 10. Thus, a single corrugated member arrangement is employed to form multiple flow paths 270 having cross corrugations that direct two flows 250, 255 in much the same way as the arrangement illustrated in FIG. 8.

Specifically, the flow of compressed gas 250 passes through the precooler/reheater 260 in a downward direction and exits from the lower surface 190 at the inner portion 240 of the precooler/reheater 260. The guide member 235 is positioned to guide the now precooled flow of compressed gas 250 to the evaporator 165. The flow of substantially dry air 255 passes upward through the precooler/reheater 260 by entering alternating flow paths 270 at the outer portion 245 of the lower surface 190 and exiting through the upper surface 185 in the outlet space 210 within the annulus.

Figure 3:
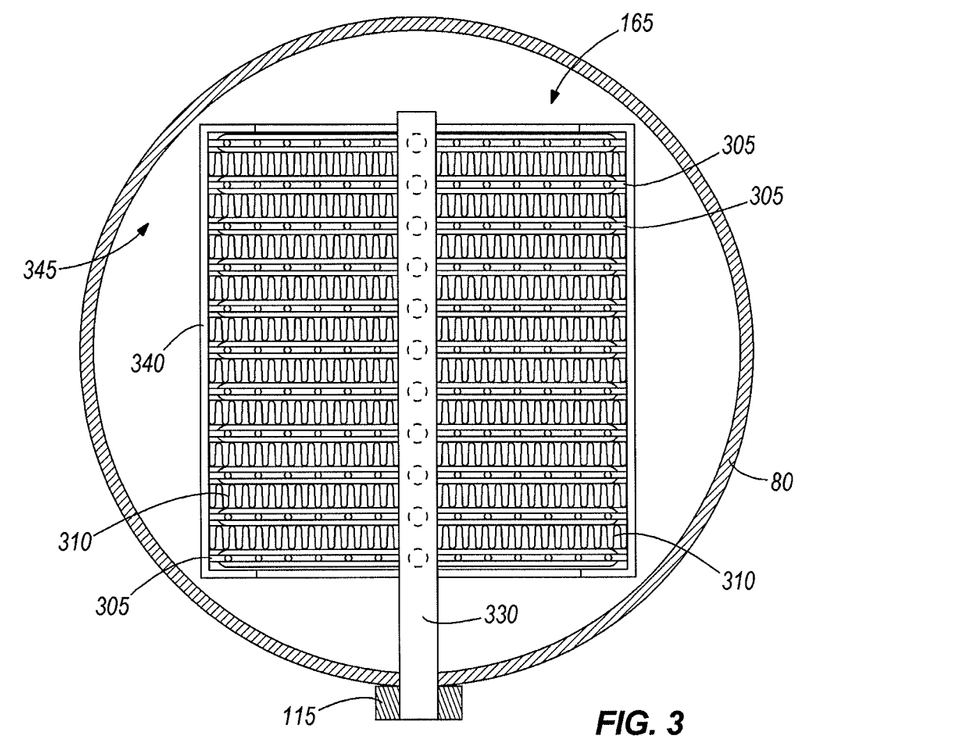
FIG. 3 is a partial section view of the dryer of FIG. 2 taken along line 3-3 of FIG. 2.
Figure 4:
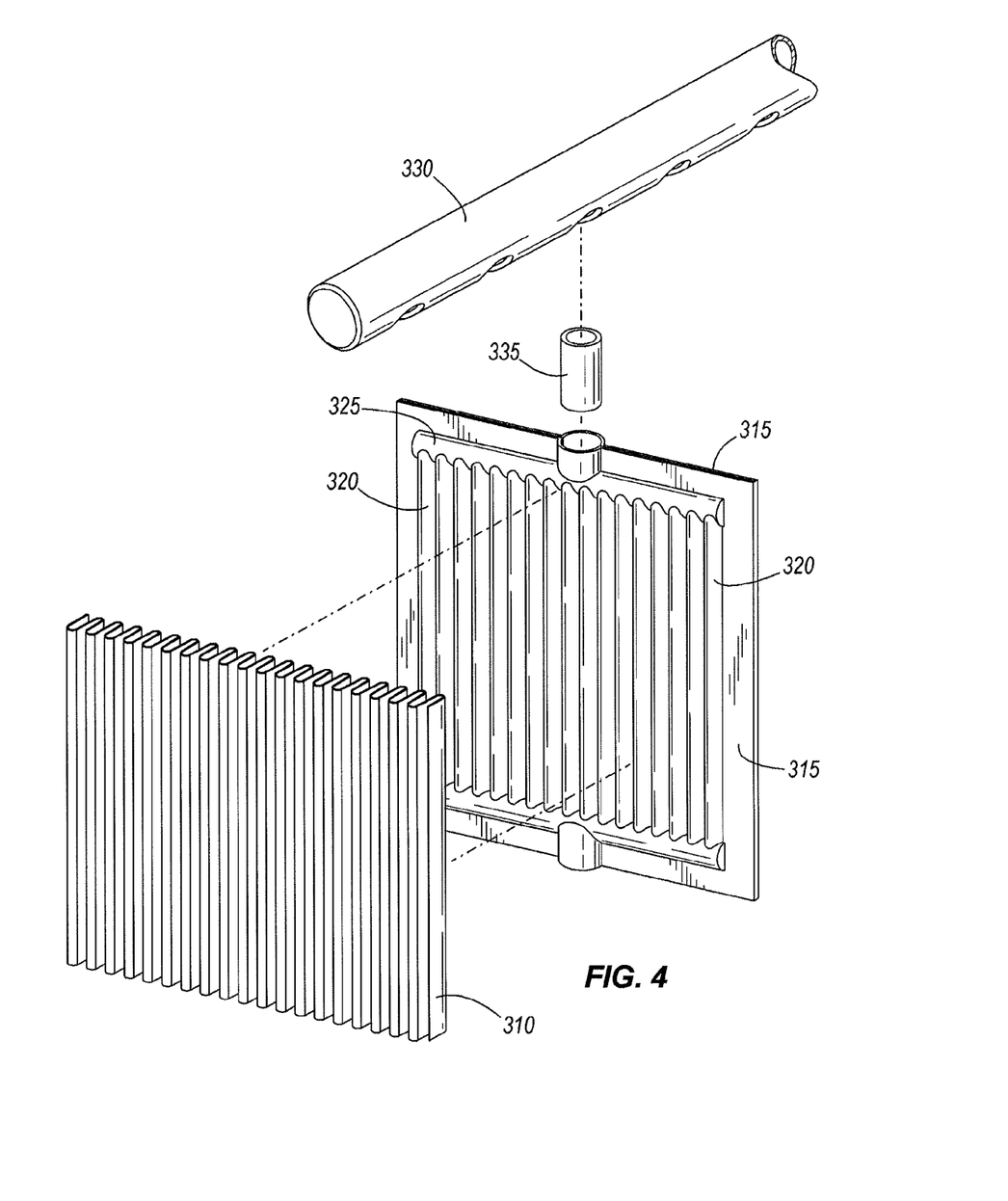
FIG. 4 is an exploded perspective view a portion of an evaporator for use with the dryer of FIG. 2.

Turning to FIGS. 3 and 4, one construction of an evaporator 160 includes a plurality of levels 305 separated by fins 310. Each of the levels 305 includes a single flow layer that includes two plates 315 arranged to define an interior flow path. The plates 315 are arranged to define a plurality of vertical flow paths 320 and a horizontal manifold 325 that distributes fluid to the vertical flow paths 320. Of course, other arrangements and orientations of the various flow paths 320 could be employed if desired.

A distribution tube 330 extends from the refrigerant inlet 110 and includes a plurality of apertures along its length. Tubes 335 connect one of the apertures to each of the levels 305 to distribute refrigerant to the manifold 305. A similar arrangement is employed for the outlet 115 and operates to collect the refrigerant and direct the refrigerant to the refrigerant outlet 115.

The fins 310 attach to adjacent levels 305 and define vertical flow paths outside of the levels 305. Thus, refrigerant can flow upward through the levels 305 and compressed gas can flow downward through the fins 310 between the levels 305 to facilitate cooling of the compressed gas. As illustrated in FIG. 3, the levels 305 and fins 310 are substantially contained within a housing 340 such that there is a space 345 between the housing 340 and the pressure vessel 80.

Figure 5:
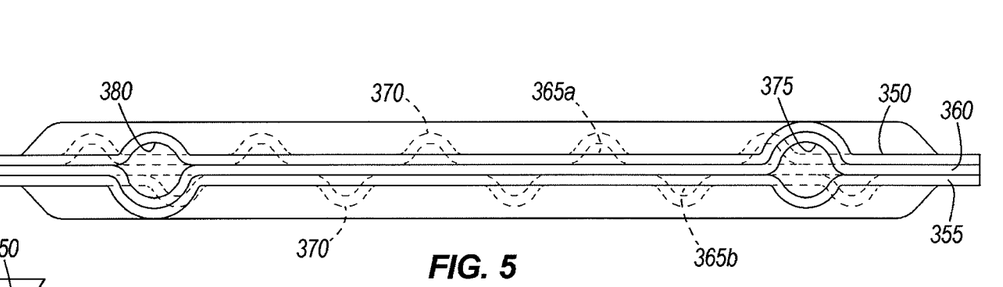
FIG. 5 is a top view of a portion of the evaporator of FIG. 4.

FIG. 5 illustrates another construction of a level 305a that is suitable for use with the evaporator 165 of FIG. 3. The levels 305a, when stacked cooperate to define a dual layer evaporator. The level 305a of FIG. 5 includes a first outer plate 350, a second outer plate 355, and a middle plate 360 that cooperate to define dual flow layers 365a 365b. The first outer plate 350 includes a plurality of corrugations 370 and abuts the substantially flat middle plate 360 to define a first plurality of flow paths that make up the first flow layer 365a. The second outer plate 355 includes a plurality of corrugations 370 and abuts the opposite side of the middle plate 360 to define a second plurality of flow paths that make up the second flow layer 365b. Thus, the three plates 350, 355, 360 define two separate flow paths 365a, 365b within the level 305a and separated by the middle plate 360.

Each level 305a includes two inlets 375 (one shown in FIG. 5) and two outlets 380 (one shown in FIG. 5). One inlet 375 directs a first flow into the first plurality of flow paths 365a and one outlet 380 discharges that first flow. The second inlet 375 directs a second flow into the second plurality of flow paths 365 band the second outlet 380 discharges the second flow.

Figure 6:
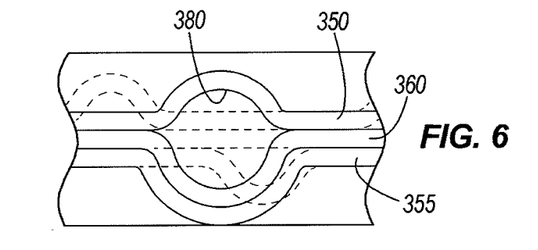
FIG. 6 is an enlarged top view of an inlet/outlet opening of the evaporator of FIG. 4.

FIG. 5 illustrates one inlet 375 and one outlet 380 located on one end of a level 305a. The opposite end of the level 305a includes the corresponding outlet 380 and inlet 375. The inlet 375 and outlet 380 corresponding to the first plurality of flow paths 365a are formed by bending or swaging the middle plate 360 toward the second outer plate 355. As illustrated in FIG. 6, the swagging results in a circular opening that provides fluid communication with the first plurality of flow paths 365a. Similarly, the inlet 375 and the outlet 380 corresponding to the second plurality of flow paths 365b are formed by bending or swaging the middle plate 360 toward the first outer plate 350. A tube can be brazed or otherwise attached to the opening as desired.

The construction of FIGS. 5 and 6 thus includes one flow path 365a that conducts a flow of refrigerant in much the same way as the construction of FIGS. 3 and 4. The refrigerant enters the pressure vessel 80, flows upward through the various flow paths 365a and then flows out of the pressure vessel 80. As illustrated in FIG. 1, a second fluid (e.g., glycol, a salt solution, water, etc.) can flow through the second flow paths 365b and act as a thermal sink to reduce or stabilize the load on the refrigeration system 30 that delivers the refrigerant. The second fluid system 35 includes an inlet 385 and an outlet 390 that can be positioned at 90 degrees with respect to the refrigerant inlet 110 and outlet 115, opposite the refrigerant inlet 110 and outlet 115, or at any other convenient position on the pressure vessel 80. As illustrated in FIG. 1, the inlet 385 is disposed opposite the refrigerant outlet 115 and the outlet 390 is disposed opposite the refrigerant inlet 110 such that the flow flows downward through the flow paths 365b of the evaporator 165. Of course other flow arrangements are possible.

Figure 7:
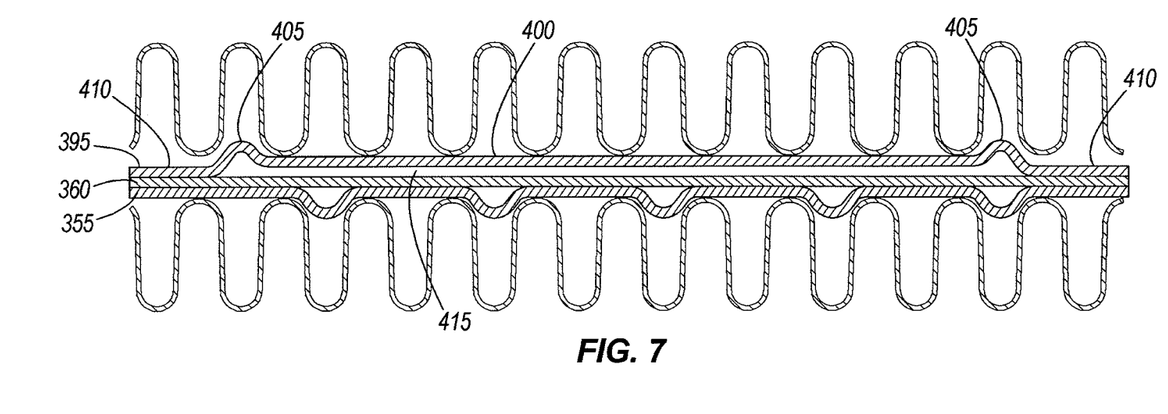
FIG. 7 is a section view of a portion of another evaporator suitable for use as with the dryer of FIG. 2.

FIG. 7 illustrates yet another dual flow construction of a level 305b suitable for use in the evaporator 165 of FIG. 3. The level 305b of FIG. 7 includes a first outer plate 350 that includes a plurality of corrugations 370. A middle plate 360 is disposed adjacent the first outer plate 355 and cooperates with the first outer plate 355 to define a plurality of flow paths 365a. A second outer plate 395 is positioned adjacent the middle plate 360 opposite the first outer plate 355. The second outer plate 395 includes a middle portion 400 and two side bends 405 that define two side portions 410 that directly abut the middle plate 360. The side bends 405 are positioned adjacent the two sides 410 and operate to displace the middle portion 400 of the second outer plate 395 from the middle plate 360 to define a sealed space 415 therebetween. Water can be positioned within the sealed space 415 to provide a thermal sink during operation. The water does not circulate as in the construction of FIGS. 6 and 7. Rather, it is trapped in the space 415. The two side bends 405 provide sufficient flexibility of the second outer plate 395 to allow the water to repeatedly freeze and thaw. Of course, other constructions could employ a different liquid or material within the sealed space 415 if desired.

In preferred constructions, the different plates used to form the various constructions of the evaporator 165 are brazed together to seal the various flow paths and to provide a structurally sound evaporator 165. Similarly, the different components of the precooler/reheater 160 are brazed together to seal the various flow paths and to provide a structurally sound precooler/reheater 160.

In operation, the compressor 15 operates to draw in a flow of gas to be compressed. For purposes of this description, the gas will be described as moist air. However, as has been noted, the system can operate to compress many other gases. Operation of the prime mover 20 rotates the rotating element of the compressor 15 such that the compressor 15 discharges the flow of compressed air and the entrained fluid or water. The flow 250 enters the dryer 25 via the compressed gas inlet 65 and flows downward through the precooler/reheater 160. The flow of compressed air 250 enters the precooler/reheater 160 around the inlet space 205, flows through the precooler/reheater 160 where it is cooled, and is discharged through the inner portion 240 adjacent the bottom surface 190.

The flow guide 235 directs the now precooled flow 250 into the evaporator 165 where the flow 250 is further cooled. In constructions that employ the evaporator of FIGS. 3 and 4, refrigerant flows in an upward direction through the levels 305 of the evaporator 165, while the compressed air 250 flows downward through the fins 310. In evaporator constructions that use levels 305a arranged as illustrated in FIGS. 5 and 6, refrigerant may flow through the first plurality of flow paths 365a and a glycol solution, a salt solution, or another fluid may flow through the second plurality of flow paths 365b. The refrigerant operates to cool the glycol, thereby providing a thermal sink to cool the compressed air. Thus, the refrigerant system 30 that provides the refrigerant can operate in a more uniform manner or can be smaller. The refrigerant system 30 can cool the glycol when less refrigerant capacity is needed to cool the air and the refrigerant and glycol can both be used to cool the air when refrigerant alone is not sufficient. In constructions that employ levels 305b arranged as illustrated in FIG. 7, the refrigerant flows in the $1^{st}$ plurality of flow paths 365a to cool the compressed air and the layer of water disposed in the space 415 such that the water/ice acts as a thermal sink (similar to the glycol of FIGS. 5 & 6) to cool the compressed air. These arrangements allow the refrigeration system to cycle to an off condition more frequently than systems that use a more conventional arrangement to reduce the power usage. In addition, smaller refrigeration systems can be employed and run at a more continuous level, relying on the thermal sink to provide additional cooling during periods when the capacity of the refrigeration system alone is insufficient.

As the air cools, it drops below its inlet dew point and water condenses out of the flow 250. The flow 250 then passes through a second guide 420 and into the separator 170. The separator 170 separates the flow into a flow of substantially dry air 255 and a liquid (water 425). The water 425 collects in the bottom of the pressure vessel 80. As the water level increases, the float 180 lifts to open the drain 70 and allow water 425 to drain from the pressure vessel 80. The substantially dry air 255 reverses direction and flows upward around the outside of the evaporator 165 in the space 345 between the housing 340 and the pressure vessel 80. The substantially dry air 255 then enters the bottom of the precooler/reheater 160 at the outer portion 245, flows upward through the precooler/reheater where the substantially dry air 255 is reheated, and out the outlet space 210 within the annulus. The precooler/reheater 160 heats the substantially dry air 255 to provide some dew point separation to assure that additional water does not condense out of the flow 255 during use and reduces the likelihood of external sweating of the downstream pipes 120. The now heated substantially dry air 255 flows within the divider 200 to the compressed gas outlet 75 where it is discharged to the point-of-use or to another component as may be required. The precooler/reheater also significantly reduces the cooling load on the evaporator 165 by precooling the inflowing gas using the outgoing compressed dry gas.

Thus, the invention provides, among other things, a gas dryer 25 disposed in a single housing 80. Various features and advantages of the invention are set forth in the following claims.

What is claimed is:

1. A dryer operable to separate a portion of an entrained liquid from a flow of gas, the dryer comprising:
   a pressure vessel operable to contain the flow of gas and entrained liquid within the pressure vessel at a full operating pressure, the pressure vessel including a gas inlet, a gas outlet, and a drain positioned at a bottom of the pressure vessel;
   a precooler/reheater positioned within the pressure vessel to receive and cool the flow of gas and the entrained liquid from the inlet, the precooler/reheater including a plurality of corrugated plates positioned between an upper surface and a lower surface thereof;
   a divider defined by a housing having an internal region extending from the upper surface of the precooler/reheater to sealingly engage with an extension of the gas outlet, the housing configured to divide an upper space defined between the pressure vessel and the divider into an inlet space in fluid communication with the gas inlet external to the housing and an outlet space in fluid communication with the gas outlet defined within the internal region of the housing;
   an evaporator positioned within the pressure vessel to receive and cool the flow of gas and the entrained liquid from the precooler/reheater;
   a separator positioned to receive the flow of gas and the entrained liquid from the evaporator, the separator operable to separate the flow of gas and the entrained liquid into a flow of substantially dry gas and a liquid, the liquid collecting in the bottom of the pressure vessel, the flow of substantially dry gas flowing upward through the precooler/reheater to heat the flow of substantially dry gas and out the gas outlet; and
   a drain valve movable between an open position and a closed position in response to the quantity of liquid within the bottom of the pressure vessel, wherein the liquid in the bottom of the pressure vessel exits via the drain when the drain valve is in the open position.

2. The dryer of claim 1, wherein the precooler/reheater is sized to abut the pressure vessel wall to inhibit flow around the precooler/reheater.

3. The dryer of claim 1, wherein the upper surface and a lower surface are substantially parallel, and the plurality of corrugated plates includes corrugations that are arranged at an oblique angle with respect to the upper surface and the lower surface.

4. The dryer of claim 3, wherein the corrugated plates cooperate to define a first plurality of flow paths and a separate second plurality of flow paths, the flow of gas and the entrained liquid passing downward through the first plurality of flow paths to cool, and the flow of substantially dry gas flows upward through the second plurality of flow paths to heat the flow of substantially dry gas.

5. The dryer of claim 1, wherein the precooler/reheater includes an elastomeric seal formed between adjacent corrugated plates.

6. The dryer of claim 1, wherein the evaporator includes a first corrugated plate, a second corrugated plate, and a middle plate, the first corrugated plate and the middle plate cooperating to define a first side and the second corrugated plate and the middle plate cooperating to define a second side, the first side adapted to receive a flow of refrigerant and the second side adapted to receive the flow of second heat sink fluid.

7. The dryer of claim 6, wherein the heat sink fluid includes glycol.

8. The dryer of claim 6, wherein the heat sink fluid includes water that transitions between a liquid and a solid.

9. The dryer of claim 1, wherein the drain valve includes a float that moves to an open position to open the drain in response to the liquid exceeding a predetermined liquid level.

10. The dryer of claim 1, further comprising a plastic liner disposed within the pressure vessel to inhibit direct contact between the liquid and the pressure vessel.

11. A gas compression system comprising:
    a compressor operable to produce a flow of compressed gas, the compressed gas including a quantity of moisture;

a refrigeration system operable to produce a flow of chilled refrigerant; a pressure vessel including an outlet, a drain, and an inlet in fluid communication with the compressor to receive the flow of compressed gas and the quantity of moisture;

a precooler/reheater positioned within the pressure vessel to receive and cool flow of compressed gas and the quantity of moisture from the inlet, the precooler/reheater including a plurality of corrugated plates positioned between an upper surface and a lower surface thereof;

a divider including a housing enclosing an internal region, the divider extending from the upper surface of the precooler/reheater configured to divide an upper space defined between the pressure vessel and the divider into an inlet space defined by an external region formed around the housing in fluid communication with the inlet and an outlet space defined within the internal region of the housing in fluid communication with the outlet;

a dual layer evaporator positioned within the pressure vessel to receive and cool the flow of gas and the entrained liquid from the precooler/reheater, the dual layer evaporator including a first layer formed to pass the flow of chilled refrigerant and a second layer formed to hold a heat sink fluid, the flow of chilled refrigerant operable to cool the flow of compressed gas and the heat sink fluid; and a separator positioned to receive the flow of compressed gas and the quantity of moisture and operable to separate the flow of compressed gas and the quantity of moisture into a flow of substantially dry gas and a quantity of liquid.

12. The dryer of claim 11, wherein the precooler/reheater is sized to abut the pressure vessel wall to inhibit flow around the precooler/reheater.

13. The dryer of claim 11, wherein the upper surface and lower surface are substantially parallel, and the plurality of corrugated plates includes corrugations that are arranged at an oblique angle with respect to the upper surface and the lower surface.

14. The dryer of claim 13, wherein the corrugated plates cooperate to define a first plurality of flow paths and a separate second plurality of flow paths, the flow of compressed gas and the quantity of moisture passing downward through the first plurality of flow paths to cool, and the flow of substantially dry gas flows upward through the second plurality of flow paths to heat the flow of substantially dry gas.

15. The dryer of claim 11, wherein the precooler/reheater includes an elastomeric seal formed between adjacent corrugated plates.

16. The dryer of claim 11, wherein the evaporator includes a first corrugated plate, a second corrugated plate, and a middle plate, the first corrugated plate and the middle plate cooperating to define a first side and the second corrugated plate and the middle plate cooperating to define a second side, the first side adapted to receive the flow of chilled refrigerant and the second side adapted to receive the heat sink fluid.

17. The dryer of claim 16, wherein the heat sink fluid includes a flow of fluid.

18. The dryer of claim 16, wherein the heat sink fluid includes a trapped quantity of water.

19. The dryer of claim 11, further comprising a drain valve movable between an open position and a closed position in response to the quantity of liquid within the bottom of the pressure vessel, wherein the liquid in the bottom of the pressure vessel exits via the drain when the drain valve is in the open position.

20. A gas compression system comprising:

a compressor operable to produce a flow of compressed gas, the compressed gas including a quantity of moisture;

a refrigeration system operable to produce a flow of chilled refrigerant;

a pressure vessel including an outlet, a drain, and an inlet in fluid communication with the compressor to receive the flow of compressed gas and the quantity of moisture;

a precooler/reheater including an upper surface and a lower surface that is substantially parallel to the upper surface, the precooler/reheater including a plurality of corrugated plates;

a divider having an enclosed region extending from the upper surface of the precooler/reheater to the outlet, the divider configured to divide an upper space defined between the pressure vessel and the divider into an inlet space in fluid communication with the inlet and an outlet space in fluid communication with the outlet, and wherein the enclosed region defines a portion of the outlet space;

wherein the plurality of corrugated plates include corrugations that are arranged at an oblique angle with respect to the upper surface and the lower surface, the corrugated plates cooperating to define a first plurality of flow paths and a separate second plurality of flow paths, the flow of compressed gas and the quantity of moisture passing downward through the first plurality of flow paths to cool the flow of compressed gas and the quantity of moisture;

an evaporator positioned within the pressure vessel to receive the flows of chilled refrigerant and to further cool the flow of compressed gas and the quantity of moisture; a separator positioned to receive the flow of compressed gas and the quantity of moisture from the evaporator, the separator operable to separate the flow of compressed gas and the quantity of moisture into a flow of substantially dry gas and a liquid, the liquid collecting in the bottom of the pressure vessel, the flow of substantially dry gas flowing upward through the precooler/reheater to heat the flow of substantially dry gas and out the gas outlet; and a drain valve movable between an open position and a closed position in response to the quantity of liquid within the bottom of the pressure vessel, wherein the water in the bottom of the pressure vessel exits via the drain when the drain valve is in the open position.

21. The dryer of claim 20, wherein the precooler/reheater is sized to abut the pressure vessel wall to inhibit flow around the precooler/reheater.

22. The dryer of claim 20, wherein the precooler/reheater includes an elastomeric seal formed between adjacent corrugated plates.

23. The dryer of claim 20, wherein the evaporator includes a first corrugated plate, a second corrugated plate, and a middle plate, the first corrugated plate and the middle plate cooperating to define a first side and the second corrugated plate and the middle plate cooperating to define a second side, the first side adapted to receive the flow of chilled refrigerant and the second side adapted to receive a heat sink fluid.

24. The dryer of claim 23, wherein the heat sink fluid includes a flow of fluid.

25. The dryer of claim 2, wherein the heat sink fluid includes a trapped quantity of water.

\* \* \* \* \*